United States Patent
Lin et al.

(10) Patent No.: US 8,731,337 B2
(45) Date of Patent: *May 20, 2014

(54) DENOISING AND ARTIFACT REMOVAL IN IMAGE UPSCALING

(75) Inventors: Zhe Lin, Fremont, CA (US); Scott D. Cohen, Sunnyvale, CA (US); Jen-Chan Chien, Saratoga, CA (US); Sarah A. Kong, Cupertino, CA (US); Jianchao Yang, Champaign, IL (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/565,379

(22) Filed: Aug. 2, 2012

(65) Prior Publication Data
US 2013/0034311 A1 Feb. 7, 2013

Related U.S. Application Data

(60) Provisional application No. 61/515,791, filed on Aug. 5, 2011.

(51) Int. Cl.
*G06K 9/32* (2006.01)
*G06K 9/00* (2006.01)

(52) U.S. Cl.
USPC ........................................................ 382/298

(58) Field of Classification Search
USPC ......... 382/162, 164, 167, 254, 275, 298–300; 348/220.1, 231.99, E05.024, E05.031; 375/215, 354
See application file for complete search history.

(56) References Cited

U.S. PATENT DOCUMENTS

| | | | |
|---|---|---|---|
| 6,563,893 B2 * | 5/2003 | Smith et al. | 375/354 |
| 7,623,574 B2 | 11/2009 | Holcomb | |
| 7,941,004 B2 | 5/2011 | Zhu et al. | |
| 8,009,921 B2 | 8/2011 | Csurka | |
| 8,655,109 B2 | 2/2014 | Lin et al. | |
| 8,687,923 | 4/2014 | Lin et al. | |
| 2012/0320228 A1 * | 12/2012 | Imade | 348/220.1 |
| 2013/0028538 A1 | 1/2013 | Simske et al. | |
| 2013/0034299 A1 * | 2/2013 | Lin et al. | 382/162 |
| 2013/0034311 A1 * | 2/2013 | Lin et al. | 382/275 |
| 2013/0034313 A1 * | 2/2013 | Lin et al. | 382/299 |
| 2013/0038758 A1 * | 2/2013 | Imade | 348/231.99 |
| 2013/0064472 A1 | 3/2013 | Zhang et al. | |

OTHER PUBLICATIONS

A. Buades, B. Coll, and J. M. Morel. A non local algorithm for image denoising. In IEEE Conference on Computer Vision and Pattern Recognition, 2005 pp. 1-6.

(Continued)

*Primary Examiner* — Amir Alavi
(74) *Attorney, Agent, or Firm* — Wolfe-SBMC

(57) ABSTRACT

Methods and systems for denoising and artifact removal in image upscaling are disclosed. In one embodiment, a low frequency band image intermediate is obtained from an input image. An upsampled image intermediate is obtained from the input image by upsampling. A result image is estimated, based at least in part on the upsampled image intermediate, the low frequency band image intermediate, and the input image. The input image is of a smaller scale than the result image. The estimating the result image further includes eliminating from the result image noise that is present in the input image.

20 Claims, 16 Drawing Sheets

(56) References Cited

OTHER PUBLICATIONS

H. Chang, D.-Y. Yeung, and Y. Xiong. Super-resolution through neighbor embedding. In IEEE Computer Society Conference on Computer Vision and Pattern Recognition, vol. 1, pp. 275-282, 2004.
S. Dai, M. Han, W. Xu, Y. Wu, and Y. Gong. Soft edge smoothness prior for alpha channel super resolution. In IEEE Conference on Computer Vision and Pattern Recognition, 2007. pp. 1-8.
M. Ebrahimi and E. Vrscay. Solving the inverse problem of image zooming using self-examples. In International Conference on Image Analysis and Recognition, pp. 117-130, 2007.
R. Fattal. Upsampling via imposed edge statistics. ACM Transactions on Graphics, 26(3), 2007, pp. 1-8.
G. Freedman and R. Fattal. Image and video upscaling from local self-examples. ACM Transactions on Graphics, 28(3): pp. 1-10, 2010.
W. T. Freeman, T. R. Jones, and E. C. Pasztor. Example-based super-resolution. IEEE Computer Graphics and Applications, 22: pp. 56-65, 2002.
W. T. Freeman, E. C. Pasztor, and O. T. Carmichael. Learning low-level vision. International Journal of Computer Vision, 40(1): pp. 25-47, 2000.
D. Glasner, S. Bagon, and M. Irani. Super-resolution from a single image. In IEEE International Conference on Computer Vision, 2009, pp. 1-8.
M. Zontak and M. Irani. Internal statistics of a single natural image. In IEEE Computer Society Conference on Computer Vision and Pattern Recognition, 2011, pp. 977-984.
J. Sun, J. Sun, Z. Xu, and H.-Y. Shum. Image super-resolution using gradient profile priors. In IEEE Computer Society Conference on Computer Vision and Pattern Recognition, 2008, pp. 1-8.
J. Sun, N.-N. Zheng, H. Tao, and H.-Y. Shum. Image hallucination with primal sketch priors. In IEEE Computer Society Conference on Computer Vision and Pattern Recognition, vol. 2, pp. 729-736, 2003.
J. Yang, J. Wright, T. Huang, and Y. Ma. Image super-resolution as sparse representation of raw image patches. In IEEE Conference on Computer Vision and Pattern Recognition, 2008, pp. 1-8.
J. Yang, J. Wright, T. Huang, and Y. Ma. Image super-resolution via sparse representation. IEEE Transactions on Image Processing, 19(11), 2010, pp. 1-51.
X. Zhu and P. Milanfar. Automatic parameter selection for denoising algorithms using a no-reference measure of image content. IEEE Transactions on Image Processing, 19:3116-3132, 2010, pp. 1-30.
Morelle, Rebecca "From mortal to model", *BBC News*, (Aug. 16, 2006), 3 pages.
"Non-Final Office Action", U.S. Appl. No. 13/565,411, (Sep. 25, 2013), 6 pages.
"Notice of Allowance", U.S. Appl. No. 13/565,334, (Oct. 18, 2013), 8 pages.
"Notice of Allowance", U.S. Appl. No. 13/565,411, Jan. 14, 2014, 8 pages.
Liu, et al.,' "A High-Quality Video Denoising Algorithm based on Reliable Motion Estimation", European Conference on Computer Vision, 2010., Sep. 5, 2010, pp. 706-719.
Yang, et al.,' "Fast Image Super-resolution Based on In-place Example Regression", (2013) IEEE CVPR., 2013, 8 pages.

\* cited by examiner

DENOISING AND ARTIFACT REMOVAL IN IMAGE UPSCALING

CLAIM OF PRIORITY TO PROVISIONAL APPLICATION

This application claims benefit of priority of U.S. Provisional Application Ser. No. 61/515,791 entitled "Robust Patch Regression based on In-Place Self-similarity or Image Upscaling" filed Aug. 5, 2011, the content of which is incorporated by reference herein in its entirety.

BACKGROUND

Description of the Related Art

In computer graphics, image scaling is the process of resizing a digital image. Scaling is a non-trivial process that involves a trade-off between efficiency, smoothness and sharpness. As the size of an image is increased, so the pixels which comprise the image become increasingly visible, making the image appear "soft". Conversely, reducing an image will tend to enhance its smoothness and apparent sharpness.

Single image super-resolution or image upscaling is the technique of generating a high-resolution image from a low-resolution input. The problem is dramatically under-constrained, as one needs to predict millions of unknown pixel values based on only small number of input pixels.

Conventional solutions to the problem of upscaling thus depend on the quality of available image priors. The image priors used by conventional solutions range from simple "smoothness" priors, to more sophisticated statistical priors learned from natural images. For conventional image upscaling, the most popular and simplest methods are those based on analytical interpolations, e.g., bicubic or bilinear interpolation, with an analytical "smoothness" assumption.

SUMMARY

Methods and systems for denoising and artifact removal in image upscaling are disclosed. In one embodiment, a low frequency band image intermediate is obtained from an input image. An upsampled image intermediate is obtained from the input image by upsampling. A result image is estimated, based at least in part on the upsampled image intermediate, the low frequency band image intermediate, and the input image. The input image is of a smaller scale than the result image. The estimating the result image further includes eliminating from the result image noise that is present in the input image.

Figure 1:
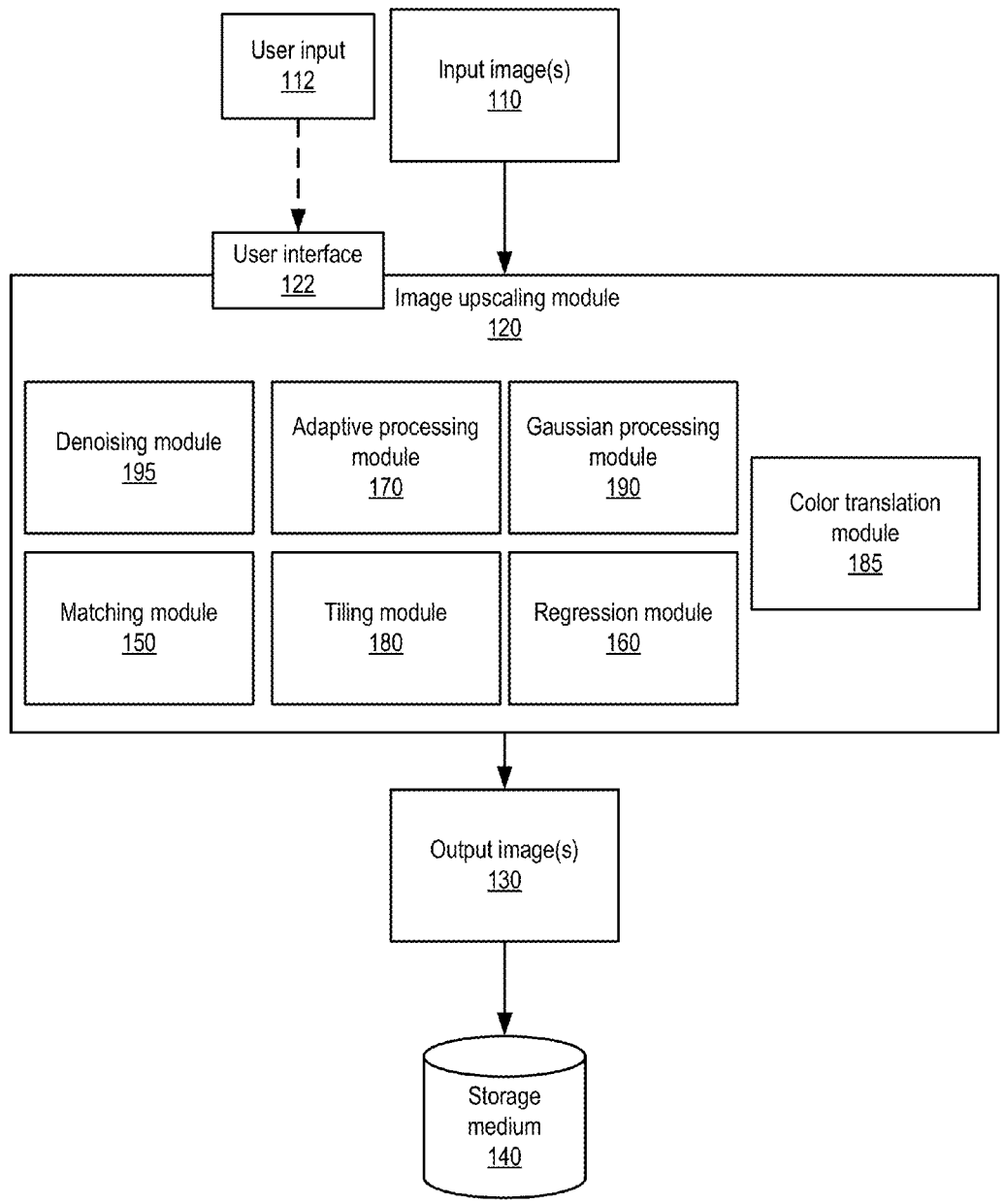
FIG. 1 illustrates a module that may implement robust patch regression based on in-place self-similarity for image upscaling, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for denoising and artifact removal in image upscaling. In one embodiment, a low frequency band image intermediate is obtained from an input image. An upsampled image intermediate is obtained. A result image is estimated, based at least in part on the upsampled image intermediate, the low frequency band image intermediate, and the input image. The input image is of a smaller scale than the result image. The estimating the result image further includes eliminating from the result image noise that is present in the input image.

In some embodiments, upsampling is the process of increasing the sampling rate of a signal. For example, upsampling raster images such as photographs means increasing the resolution of the image. An upsampled image intermediate is a data structure to which upsampling has been applied. In some embodiments, a low frequency band image intermediate is a result of a downsampling. Down-sampling of an image is the elimination of image frequencies higher than half the sampling frequency in the result image, which is called a smoothed image or low-frequency band image intermediate. In some embodiments, a low frequency band image intermediate can be divided into low-resolution image patches. A Gaussian blur is an example of a downsampling operation usable by some embodiments.

In some embodiments, the eliminating from the result image noise further includes eliminating compression artifacts. In some embodiments, the estimating the result image further includes, for each low resolution image patch in the upsampled image intermediate, identifying a single or multiple best matches as well as estimating a high-resolution patch from the upsampled image intermediate, the low frequency band image intermediate, and the input image. In such embodiments, the estimating the result image further includes repeating the identifying a single or multiple best matches and estimating a high resolution patch for a set of spatially overlapping, densely sampled low resolution patches to generate a set of overlapping pixels.

In some embodiments, the identifying best matches includes find k nearest neighbor patches. In some embodiments, the estimating a high resolution patch includes denoising the center pixel of the low resolution patch by averaging it with center pixels of the best matching patches, and performing regression for each of the best matching patches to generate a set of regression results, and obtaining a final result using a weighted linear combination of the set of regression results. Some embodiments further include performing iterative repetitions of the obtaining the low frequency band image intermediate, the obtaining an upsampled image intermediate and the estimating the upscaling result image. Some embodiments further include, in response to an iterative repetition exceeding a user-designated upscaling parameter, generating a final result image by downscaling a result of the iterative repetition exceeding the user-designated upscaling parameter. In some embodiments, each of iterative repetitions further comprises upscaling the image by a factor of 1.5. In some embodiments, the obtaining the low frequency band image intermediate from the input image further includes translating the input image from a native colorspace to an intermediate colorspace, and the estimating the result image further comprises generating a result image in the native colorspace.

Various embodiments of methods and apparatus for robust patch regression based on in-place self-similarity for image upscaling are disclosed. Embodiments employ a robust regression model for image upscaling based on in-place self-examples. In some embodiments, a first-order approximation of a nonlinear mapping function from low-resolution to high-resolution image patches is learned from a set of training patches sampled from natural images. For self-example search, some embodiments employ in-place patch matching for small scaling factors, constraining the patch searching space to be as small as 9 patches. To this end, some embodiments execute a robust regression formulation by a weighted average of prediction values based on multiple in-place neighbors to reduce variance of the regression model. In some embodiments, such a robust regression model enhances practical applications, as many input images are contaminated by noise (e.g., mobile photos) or JPEG artifacts (e.g., internet images). Examples of results from some embodiments demonstrate enhanced accuracy and robustness.

Embodiments provide a technique for high-quality single image upscaling. Some embodiments recursively upscale the input image by a small scale factor at each iteration until a desired magnification factor is reached. Some embodiments are based on a patch regression model which takes advantage of in-place self-similarities. As described below, a regression model is represented as a first-order approximation of a non-linear mapping function from low-resolution to high-resolution image patches, which is learned from a set of training patches sampled from natural images.

For self-example search, results of some embodiments show that the patch matching can be in-place for small scaling factors, constraining the patch searching space to be as small as 9 patches. To this end, some embodiments employ a robust regression formulation by a weighted average of all the prediction values based on multiple in-place neighbors to reduce the variance of the regression model, which assists in mitigating strong image noise and JPEG artifacts. Some embodiments also extend the technique to an adaptive method for faster processing. A gradient-based content metric is used by some embodiments to selectively process noise and/or texture patches for faster processing and better realism on under-sampled texture areas. Both quantitative and qualitative results of some embodiments are described and compared below.

Some embodiments exhibit enhanced signal reconstruction accuracy due to the use of a regression learning-based model. Some embodiments are also faster than alternative patch self-similarity-based approaches due to localized search. Some embodiments use "In-Place" across-scale self-similarity, which constrains a patch search region to exactly the same corresponding location at lower scales to increase the speed of the super-resolution process. Some embodiments also integrate super-resolution, denoising, and JPEG artifact removal into a simultaneously executed unified framework. Such embodiments achieve this integration by averaging multiple regression predictions for multiple nearest patches.

Some embodiments produce higher quality results for natural and realistic images by using bicubic filters to estimate an upsampled low-frequency band, which leads to more realistic upscaling results on natural images due to the predictive accuracy of bicubic filtering. In addition, some embodiments use Gaussian filters to obtain a low frequency band of the input image and thereby preserve information in low contrast areas Some embodiments perform recursive upscaling of an image (in every iteration scaling by a factor of 1.5 or a value between 1.0 and 1.5) to produce more realistic results with fewer artifacts. Some embodiments use adaptive patch processing to improve efficiency. Such embodiments employ an adaptive framework using a gradient-based local image content metric, where patches are processed selectively for faster runtime on uniform/noise/low-texture areas while limiting expensive computation to regular high-texture image structures. Some embodiments, using adaptive content metrics and "In-Place" search regions, generate realistic results on under-sampled texture areas.

Some embodiments include a means for designating an input image for upscaling. For example, an image upscaling module may receive input identifying an input image on which upscaling is to be performed and may perform the upscaling according to user-designated parameters, such as a scale factor, as described herein. The image upscaling module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying input image on which upscaling is to be performed, and performing the upscaling according to user-designated parameters, such as a scale factor, as described herein. Other embodiments of the image upscaling module may be at least partially implemented by hardware circuitry and/or firmware stored, for example, in a non-volatile memory.

Some embodiments include a method that includes obtaining a low frequency band image intermediate from an input image, upsampling the input image by a scale factor to obtain an upsampled image intermediate, and estimating a result image based at least in part on the upsampled image intermediate, the low frequency band image intermediate, and the input image. In some embodiments, the input image is of a smaller scale than the result image. In some embodiments the estimating the result image further includes, for a low resolution image patch in the upsampled image intermediate, identifying a match in a local neighborhood of the low frequency band image intermediate. In some embodiments, the obtaining a low frequency band image intermediate from the input image further includes applying a Gaussian filter to the input image. In some embodiments, the upsampling the input image by the scale factor to obtain the upsampled image intermediate further includes applying bicubic interpolation.

In some embodiments, the method further comprises translating an RGB input image into a luminance and chrominance image data structure to generate the input image. As will be apparent to one of skill in the art from having read this disclosure, color spaces supported by various embodiments will vary without departing from the scope and intent of the present disclosure. For gray-scale images, some embodiments directly execute the upscaling algorithms and procedures discussed herein. Likewise for a color RGB image, for efficiency, some embodiments convert the input image to YCbCr space, and execute the upscaling algorithms and procedures discussed herein on the luminance channel Y only, run bicubic interpolation on the Cb and Cr channels, and finally convert the upscaled YCbCr image back to an RGB result image. Other embodiments execute the upscaling algorithms and procedures discussed herein on all color channels (e.g. RGB, YCbCr, or CMYK).

In some embodiments, the estimating the result image further includes, for each low resolution image patch in the upsampled image intermediate, identifying a single or multiple best matches in a local neighborhood of the low frequency band image intermediate, estimating a high-resolution patch from the upsampled image intermediate, the low frequency band image intermediate, and the input image, and repeating the identifying a single or multiple best matches and estimating a high resolution patch for a set of spatially overlapping, densely sampled low resolution patches to generate a set of overlapping pixels, and averaging the overlapping pixels. In some embodiments, identifying best matches means finding multiple nearest patches in terms of patch distance. In some embodiments, patch distance can be computed from either a single color channel or multiple color channels. Some embodiments compute patch distance based only on a single color channel, and other embodiments compute patch distance based on (a weighted sum) of patch distances from multiple color channels (e.g. RGB, YCbCr, or CMYK) for better matching accuracy.

Some embodiments provide a system including at least one processor and a memory including program instructions. In some embodiments the program instructions are executable by the at least one processor to obtain a low frequency band image intermediate from an input image, upsample the input image by a scale factor to obtain an upsampled image intermediate, and estimate a result image based at least in part on the upsampled image intermediate, the low frequency band image intermediate, and the input image. In some embodiments, the input image is of a smaller scale than the result image.

In some embodiments, the program instructions executable by the at least one processor to obtain a low frequency band image intermediate from the input image further include program instructions executable by the at least one processor to apply a Gaussian filter to the input image. In some embodiments, the program instructions executable by the at least one processor to upsample the input image by the scale factor to obtain the upsampled image intermediate further include program instructions executable by the at least one processor to apply bicubic interpolation.

In some embodiments, the program instructions further include program instructions executable by the at least one processor to translate an RGB input image into a luminance and chrominance image data structure to generate the input image. In some embodiments, the program instructions executable by the at least one processor to estimate the result image further include, for a low resolution image patch in the upsampled image intermediate, program instructions executable by the at least one processor to identify a best match in a local neighborhood of the low frequency band image intermediate.

In some embodiments, the program instructions executable by the at least one processor to estimate the result image further include program instructions executable by the at least one processor to, for each low resolution image patch in the upsampled image intermediate, identify a single or multiple best matches in a local neighborhood of the low frequency band image intermediate, program instructions executable by the at least one processor to estimate a high-resolution patch from the upsampled image intermediate, the low frequency band image intermediate, and the input image, program instructions executable by the at least one processor to repeat identifying a single or multiple best matches and estimating a high resolution patch for a set of densely sampled, spatially overlapping low resolution patches to generate a set of overlapping pixels, and program instructions executable by the at least one processor to average the overlapping pixels.

Some embodiments include a non-transitory computer-readable storage medium storing program instructions, wherein the program instructions are computer-executable to implement obtaining a low frequency band image intermediate from an input image, upsampling the input image by a scale factor to obtain an upsampled image intermediate, and estimating a result image based at least in part on the upsampled image intermediate, the low frequency band image intermediate, and the input image. In some embodiments, the input image is of a smaller scale than the result image.

In some embodiments, the program instructions computer-executable to implement obtaining a low frequency band image intermediate from the input image further include program instructions computer-executable to implement applying a Gaussian filter to the input image. In some embodiments, the program instructions computer-executable to implement upsampling the input image by the scale factor to obtain the upsampled image intermediate further include program instructions computer-executable to implement applying bicubic interpolation.

In some embodiments, the program instructions further include program instructions computer-executable to implement translating an RGB input image into a luminance and chrominance image data structure to generate the input image. In some embodiments, the program instructions computer-executable to implement estimating the result image further comprise program instructions computer-executable to implement, for a low resolution image patch in the upsampled image intermediate, identifying a single or multiple best matches in a local neighborhood of the low frequency band image intermediate.

In some embodiments, upsampling is the process of increasing the sampling rate of a signal. For example, upsampling raster images such as photographs means increasing the resolution of the image.

Example Implementations

FIG. 1 illustrates an image upscaling module that may implement one or more of the robust patch regression based on in-place self-similarity for image upscaling techniques and tools illustrated in FIGS. 2 through 10. Image upscaling module 120 may, for example, implement one or more of an image upscaling tool, an image denoising, an artifact removal tool, or an integrated upscaling and denoising tool. FIG. 11 illustrates an example computer system on which embodiments of module 120 may be implemented. Module 120 receives as input one or more digital images 110. Module 120 may receive user input 112 activating one or more of an image upscaling tool, an image denoising, an artifact removal tool, or an integrated upscaling and denoising tool. Module 120 then upscales and/or denoises the input image(s) 110, according to user input 112 received via user interface 122, using the activated one or more of a matching module 150, a regression module 160, a tiling module 180, an adaptive processing module 170, a Gaussian processing module 190, a color translation module 185, and a denoising module 195. Module 120 generates as output one or more modified (upscaled) images 130. Output image(s) 130 may, for example, be stored to a storage medium 140, such as system memory, a disk drive, DVD, CD, etc.

In some embodiments, module 120 may provide a user interface 122 via which a user may interact with the module 120, for example to select an image for upscaling and select parameters such as an upscaling factor or efficiency/accuracy settings.

Some embodiments employ a robust patch regression model for image upscaling based on across-scale self-similar examples. Based on the self-similar examples, embodiments exploit an accurate first order approximation of this regression function with an external training dataset, which reduces the impact of a limited number of self-examples. Some embodiments employ nearest-patch matching can be done in-place, constraining the search space to be as small as 4 patches. To this end, some embodiments employ a robust regression model by a weighted average of the multiple regression predictions on the k-nearest patches from the local neighborhood to reduce the variance of the regression model, which is helpful for handling noise and JPEG artifacts for practical use. Additionally, some embodiments perform upscaling adaptively based on the content of local image structures, offering opportunities to significantly enhance the speed of such embodiments.

Robust Patch Regression Based on Self-Example

Given an input image $X_0$, some embodiments of example-based super-resolution methods first upscale the image $X_0$ to generate a blurry large image Y, and then recover the high-resolution image patch x for each low-resolution image patch y of Y, with the aid of either an external database or self-examples, or both containing high- and low-resolution image patch pairs.

Essentially, for single image super-resolution, some embodiments approximate the mapping function $f$ from the low-resolution image patch y to its corresponding high-resolution image patch x, i.e., $x=f(y)$. This function $f$ is learned from a set of high- and low-resolution training image patch pairs $\{x_i\}_{i=1}^N$ sampled from X and $\{y_i\}_{i=1}^N$ sampled from Y.

However, learning such a regression function presents obstacles due to several factors. The first of these factors is the ill-posed nature of image super-resolution. For single image upscaling, unknowns outnumber knowns. For example, use of embodiments to upscale an image by three times on both dimensions generally requires the embodiments to fill eight times more pixels than the pixels in the input image. Therefore, the mapping function $f$ from a low-resolution image patch y to x is severely ambiguous and is a problem that embodiments seek to properly regularize. Additionally, large variations may exist in the low-resolution image patch space. The content of natural images is so rich that it is difficult to capture all the instances with a compact model. Even for image patches as small as 5×5, the patch space is still huge, as there are 256 values at each pixel location.

Example-based Regression Model

For a low-resolution input image patch y, embodiments obtain a prior example patch pair $\{y_0; x_0\}$, where the two patches are related by the same mapping function $x_0 = f(y_0)$ and $y_0$ is very close to y. Such embodiments employ the following equation from the Taylor expansion, i.e.:

$$x = f(y) \quad (1)$$
$$= f(y_0 + y - y_0)$$
$$= f(y_0) + \nabla f^T(y_0)(y - y_0) + \ldots$$
$$\approx x_0 + \nabla f^T(y_0)(y - y_0).$$

Example-Based Regression Model

Embodiments exploit a first-order approximation of x, because $x - x_0$ and $y - y_0$ are related by a locally linear function $\nabla f^T(y_0)$, which is the derivative of f at location $y_0$. For purpose of further description herein, this function is referred to as $g(y_0)$. As most of the information contained in x is explained by $x_0$, and g is one degree of freedom simpler than $f$, embodiments exploit the expectation that learning g can be much simpler than learning $f$ directly.

If the low-resolution image patch space Y spans a manifold on which function g is locally linear, embodiments can ascertain the function g on a set of anchor points $\{c_1, c_2, \ldots, c_K\}$ sampled from Y. Note that the function values on the anchor points are easily expressed as a set of matrices, i.e., $g(c_k) \in \mathbb{R}^{d \times d}$, where d is the dimension of the vectorized image patch. For ease of notation, we denote $W_k = g(c_k)$. For any low resolution image patch $y^i_0$, embodiments project it to a local coordinate space spanned by $$y^i_0 = \sum_{c_k \in N(y^i_0)} w_k c_k, \quad (2)$$

where $N(y^i_0)$ denotes the set of anchor points falling into the local neighborhood of $y^i_0$. The set of weights $w_k$'s are derived from least square fitting $$\min_{w_k's} \left\| y^i_0 - \sum_{c_k \in N(y^i_0)} w_k c_k \right\|^2_2. \quad (3)$$

Assuming function g is locally linear, $$g(y^i_0) = \sum_{c_k \in N(y^i_0)} w_k g(c_k) = \sum_{c_k \in N(y^i_0)} w_k W_k. \quad (4)$$

Given a training set of example patch pairs $\{x_i, y_i\}_{i=1}^N$ and their prior example pairs $\{x_0^i, y_0^i\}_{i=1}^N$, embodiments ascertain the function g on the K anchor points by $$\min_{\{W_k\}_{k=1}^K} \sum_{i=1}^N \|(x_i - x_0^i) - g(y_0^i)(y_i - y_0^i)\|_2^2, \quad (5)$$

where $g(y^i_0)$ is given by Equation 4.

Once the function g on the K anchor points is known, embodiments can estimate the derivative function g on any input low-resolution image patch y from Equation 4, and then infer the high-resolution patch x using first-order regression by Equation 1.

Figure 2A:
FIG. 2A depicts an example of an image upscaled according to previously available methods.
Figure 2B:
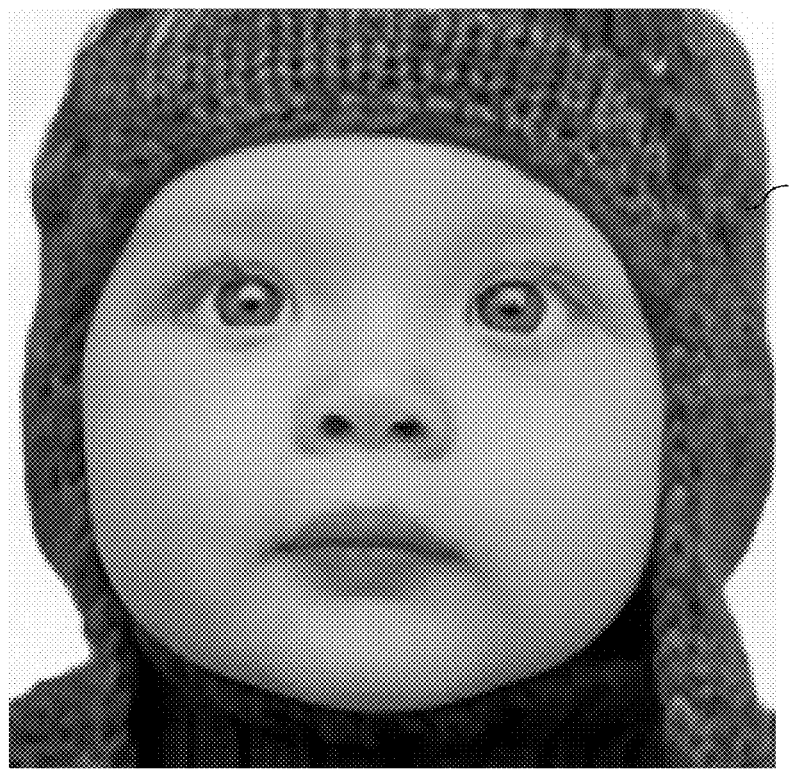
FIG. 2B illustrates an example of an image upscaled using robust patch regression based on in-place self-similarity, according to an embodiment.

FIGS. 2A-2B show the super-resolution result comparison between zero-order approximation and first-order approximation. In some embodiments, results are obtained by recovering the high-resolution image patches from overlapping low-resolution image patches, where the result overlapping pixels are averaged. FIG. 2A is a result of zero-order approximation on a portrait 210. As the zero-order approximation tends to have large approximation errors, the overlapping pixel values at the same location do not always agree with each other, and therefore, averaging them tends to blur image details. FIG. 2B is a result of first-order approximation on a portrait 220. In some embodiments, the first order approximation is more accurate and preserves the image details well.

Figure 3:
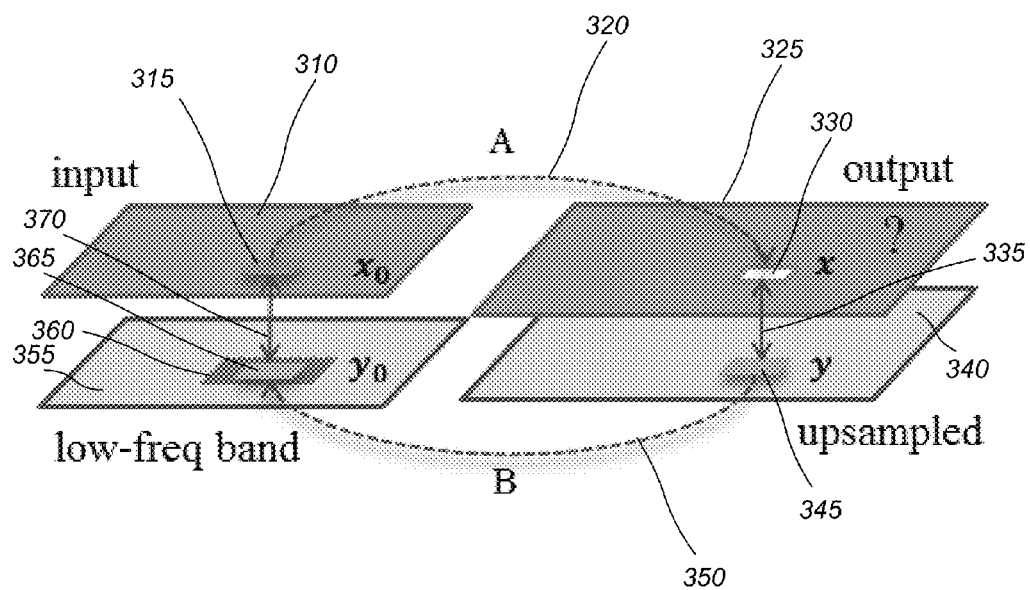
FIG. 3 depicts an image data flow for robust patch regression based on in-place self-similarity for image upscaling, according to an embodiment.

Turning now to FIG. 3, an embodiment of an upscaling method based on in-place patch matching is portrayed. For each low-resolution patch y 345 from the upsampled image Y 340, some embodiments find its best match $y_0$ 365 from the low-frequency band $Y_0$ 355 of the input image $X_0$ 310 in the area around its original location 360 (+/−1 due to subpixel interpolation). Based on $x_0$ 315, embodiments perform first-order regression 335 to generate the desired high-resolution image patch x 330. With respect to FIG. 3, some embodiments of an image upscaling approach based on in-place patch matching are described.

Some embodiments upscale the image by a small factor of s (s≤1.5). The input image 310 is denoted as $X_0$. Embodiments first obtain a low-frequency band image $Y_0$ 355 by blurring 370 input image $X_0$ 310 with, for example with a low-pass Gaussian filter. Some embodiments then zoom 350 $X_0$ using bicubic interpolation by the factor of s to get Y 340, an upsampled version of input image $X_0$ 310 which is missing high-frequency information. From $X_0$ 315, $Y_0$ 365, and Y 345, embodiments estimate 320 the high-resolution image X 325. For each low-resolution image patch y 345 of Y 340 at location (x', y'), with the upper left corner of the image as the origin, embodiments search for its best match $y_0$ 365 in a small local neighborhood 360 of (x'=s, y'=s) in $Y_0$.

Once embodiments have identified $x_0$ 315, embodiments employ a regression model to estimate 320 the high-resolution image patch x 330. Embodiments repeat the procedure for overlapping patches of Y 340, and the final image X 325 is obtained by averaging those overlapping pixels of the estimated high-resolution image patches.

For large upscaling factors, embodiments iteratively upscale the image by multiple times, each with a scaling factor of s. Empirically, searching the above example patch pair $\{x_0, y_0\}$ for y can be done in a restricted local search region around the original location of y in $Y_0$. Embodiments further demonstrate that the searching region is not only local, but even in-place for small scaling factors (i.e., less than 1.5).

By using in-place matching, some embodiments are configured such that the coordinates $(x_0, y_0)$ of the desired $y_0$ (in $Y_0$) for y at (x', y') (in Y) are at most one pixel away from the original location (x'/s, y'/s) in $Y_0$, $|x_0-x'/s|<1$ and $|y_0-y'/s|<1$. Natural images often contain sparse singular structures, such as edges and corners. For image upscaling, some embodiments keep those singular structures the same while linearly scaling the remaining areas. Such embodiments are built on the assumption that use of small image patches captures these basic singular structures that are independent of image scales. Therefore, a small patch bearing a singular structure in an upper scale image should match well with a patch from the corresponding location in a lower scale image (up to a small shift) if the upscaling factor is sufficiently small.

Figure 4:
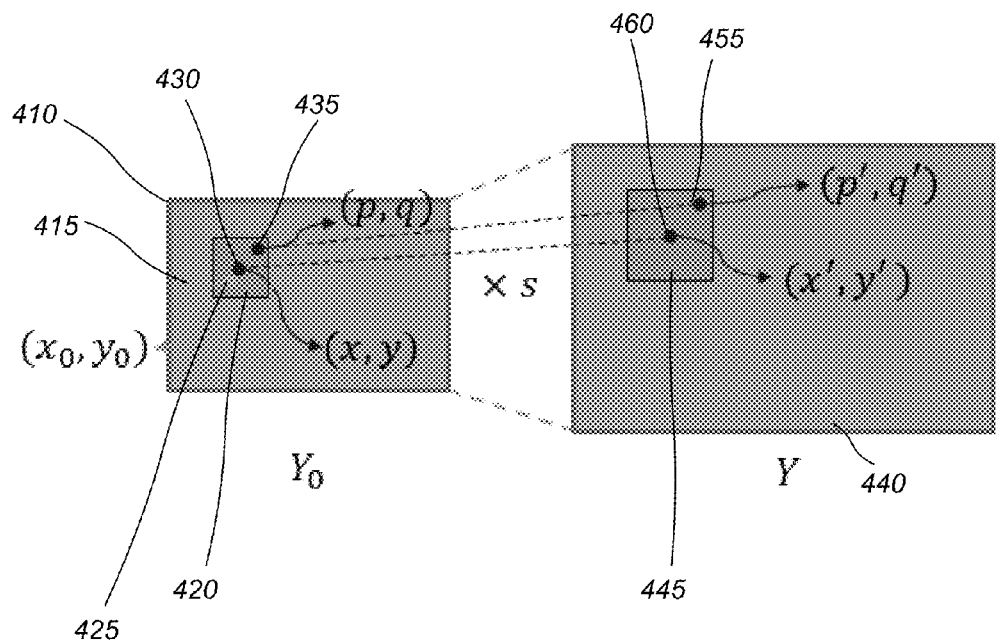
FIG. 4 illustrates image in-place patch matching for image upscaling, according to an embodiment.

FIG. 4 illustrates image in-place patch matching for image upscaling, according to an embodiment. Some embodiments perform matching that is in-place when the upscaling factor s≤1.5. For simplicity, the discussion herein is only based on continuous image signals, though embodiments within the scope of the present disclosure are not so limited. Given a low-resolution patch y 445 from Y 440, centered at location (x', y') 460, shown in FIG. 4, a center point (p'; q') 455 exists on a singular structure within this patch, which has a shift from the patch center 460 by $p'=x'+t_x$ and $q'+t_y (t_x, t_y<2.5,$ where 2.5 is the half patch size). Note that (x, y) 430 and (p, q) 435 are the continuously scaled down points for (x', y') 460 and (p', q') 455 respectively on image plane $Y_0$ 410, i.e., x=x'/s, y=y'/s and p=p'/s, q=q'/s.

When embodiments search a match 420 in $Y_0$ 410 for y 445, embodiments seek to match the singular point (p', q') 455 to (p, q) 435 and infer the high-frequency information for the singular structure in y 450. Therefore, the center 425 of the desired $y_0$ 415 will be at $x_0=p-t_x$; $y_0=q-t_y$, such that $$|x_0 - x| = |p - t_x - x'/s| \qquad (7)$$
$$= |p'/s - t_x - x'/s|$$
$$= |x'/s + t_x/s - t_x - x'/s|$$
$$= |(1-s)t_x/s| < t_x/3 < 1.,$$

and similarly $|y_0-y|<1$, which means that the center 425 of the desired $y_0$ 415 will be constrained to be less than one pixel away from (x, y) 430, the origin of (x', y') 460 before scaling, and thus the matching is in-place.

Robust Regression Formulation

In practice, input images are usually contaminated by noise (e.g., mobile photos) or JPEG artifacts (e.g., internet images). Therefore, some embodiments use a regression model that is robust to such contaminations. Some embodiments denoises the center pixel of the low resolution patch by averaging it with center pixels of the best matching patches as the preprocessing for regression to remove the noise from y. Instead of finding only one best match in the local neighborhood of (x'=s±1, y=s±1) for y 445 at location (x, y) 430 (in Y 440), embodiments keep track of T nearest neighbors, perform regression for each of them, and obtain a final result by a weighted linear combination of all the T regression results. Suppose the T matched example pairs for y 445 are $\{y_0^i: x_0^i\}_{i=1}^T$. Some embodiments exploit the observation that $$x = \sum_i^T \alpha_i \{x_0^i + g(y_0^i)(y - y_0^i)\}, \qquad (8)$$

where $$\alpha_i = \frac{1}{Z}\exp\left(-\frac{\|y - y_0^i\|_2^2}{2\sigma^2}\right), \qquad (9)$$

and $$Z = \sum_{i=1}^T \exp\left(-\frac{\|y - y_0^i\|_2^2}{2\sigma^2}\right). \qquad (10)$$

Adaptive Patch Processing

Natural images frequently contain large smooth regions as well as strong discontinuities, e.g., edges and corners. Although simple interpolation methods for image upscaling, e.g., bilinear or bicubic interpolation, will result in noticeable artifacts along the edges and corners, such as ringing, jaggy and blurring effects, embodiments exploiting such methods may perform very well on smooth regions. Thus, some embodiments selectively process those textured regions using the advanced upscaling model and methods disclosed herein, while leaving the large smooth regions to those simple interpolation techniques. On the other hand, on smooth regions or subtle texture regions with noise, even with a very small search window, the matching may overfit to noise. Therefore, some embodiments either leave those regions to interpolation or further constrain the matching to be exact in-place.

Some embodiments measure image structures by image gradients. In particular, consider the gradient matrix over an M×M window:

$$G = \begin{bmatrix} \vdots & \vdots \\ g_x(k) & g_y(k) \\ \vdots & \vdots \end{bmatrix}, \qquad (11)$$

where $[g_x(k) g_y(k)]$ denotes the gradient of the image at location $(x_k, y_k)$ within the window. By Singular Value Decomposition (SVD) on G, some embodiments calculate the singular values $s_1 \geq s_2 \geq 0$ representing the energies in the dominant local gradient and edge orientations. Some embodiments, therefore, use the following two image content metrics:

$$R = \frac{s_1 - s_2}{s_1 + s_2}, \qquad (12)$$
$$Q = s_1 \frac{s_1 - s_2}{s_1 + s_2}$$

to differentiate smooth and textured regions.

Figure 7A:
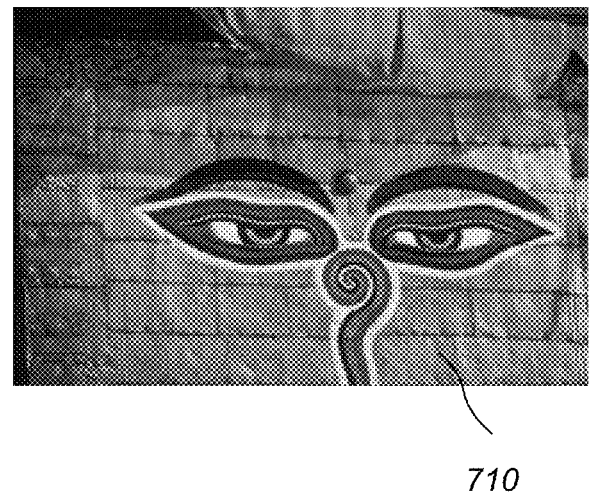
FIG. 7A depicts an image used for measurement of Q values calculated as described herein.
Figure 7B:
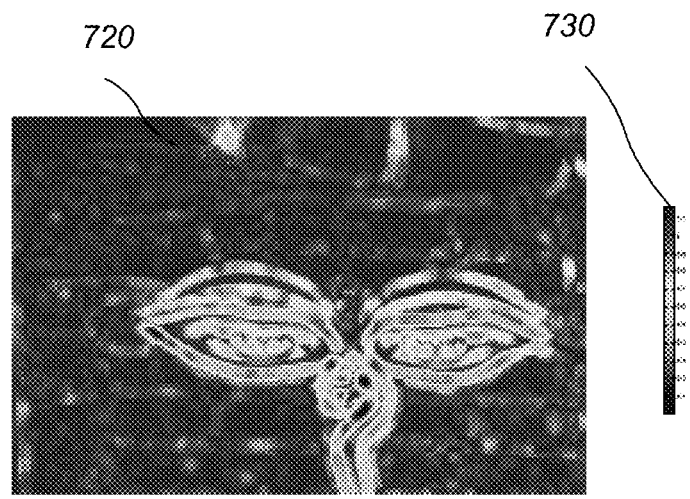
FIG. 7B illustrates a mapping of Q values calculated as described herein for FIG. 7A.

FIG. 7A depicts an image used for measurement of Q values calculated as described herein. FIG. 7B illustrates a mapping of Q values calculated as described herein for FIG. 7A. Turning now to FIG. 7A, a test image 710 is shown for which R and Q are calculated and displayed in a graph 720 with a scale 730 in FIG. 7B. Thus R and Q are large for textured regions and small for smooth regions. FIG. 7B shows the Q values over spatial locations for a natural image, where Q is small on most pixel locations (smooth regions). Pixel values are pre-scale between 0 and 1.

Implementation and Results

Some embodiments upscale the given input image $X_0$ by a factor of 1.5 (or a value between 1.0 and 1.5) each time. In such embodiments, the low-frequency band Y of the target high-resolution image is approximated by the bicubic interpolation of $X_0$ with the same factor. The low-frequency band of $X_0$ is obtained by a low-pass Gaussian filtering with standard deviation 0.55. Given the regression model, for each low-resolution patch y of Y, embodiments find its in-place matching path in $Y_0$ and the corresponding high-resolution image patch $x_0$ from $X_0$, and then perform regression using Equation 8. Some embodiments set T=1 in Equation 8 for clean input images and T=9 (or T can be larger for better accuracy but slower computation speed) for noisy images. The image patches are processed with overlapping pixels, and some embodiments average the multiple predictions of each pixel location on the result image.

For adaptive patch processing, some embodiments compute the R and Q values on each pixel location. Such embodiments then will skip processing a patch or use exact in-place matching if its center R value is smaller than 0.4 or Q value is smaller than 0.03. For large upscaling factors, some embodiments upscale the image iteratively by multiple times.

Preparing Training Data

To train the regression model, some embodiments are exposed to a set of natural images $\{X^i\}_{i=1}^{M}$. The corresponding low-resolution images $\{X_0^i\}_{i=1}^{M}$ are generated by downscaling with a factor of 1.5. The corresponding two low-frequency band image sets $\{Y_i\}_{i=1}^{M}$ and $\{Y_0^i\}_{i=1}^{M}$ are created as described above. Then image patch pairs are randomly sampled from $\{Y^i\}_{i=1}^{M}$ and $\{X^i\}_{i=1}^{M}$ to obtain the low- and high-resolution patch pairs $\{x_i, y_i\}_{i=1}^{N}$ and at the same time get the corresponding in-place matching image pairs $\{x_0^i, y_0^i\}_{i=1}^{N}$ from $\{x_0^i\}_{i=1}^{M}$ and $\{y_0^i\}_{i=1}^{M}$. The anchor points $\{c_1, c_2, \ldots, c_K\}$ are obtained from clustering on the low-resolution image patch set $\{y_i\}_{i=1}^{N}$. The first order regression model is learned by solving a least square problem.

TABLE 1

Prediction RMSEs for different approaches on the testing patches.

|  | bicubic | 0 order | freq. trans. | 1st order |
|---|---|---|---|---|
| RMSE | 6.08 | 9.39 | 5.82 | 4.08 |

Preliminary comparisons of the present embodiments to alternative methods on single image super-resolution differ both quantitatively and qualitatively. Table 1, above, shows the prediction errors of different approaches. "freq. trans." stands for high-frequency band transfer used by previous example-based approaches. "$1^{st}$ order" denotes the regression model embodiments described herein. "0 order" performs the worst, even worse than "bicubic". But by simply adding Δy, "freq. trans." performs better than "bicubic". By using a more accurate model, some embodiments described herein ("1st order") regression model performs well.

Figure 5A:
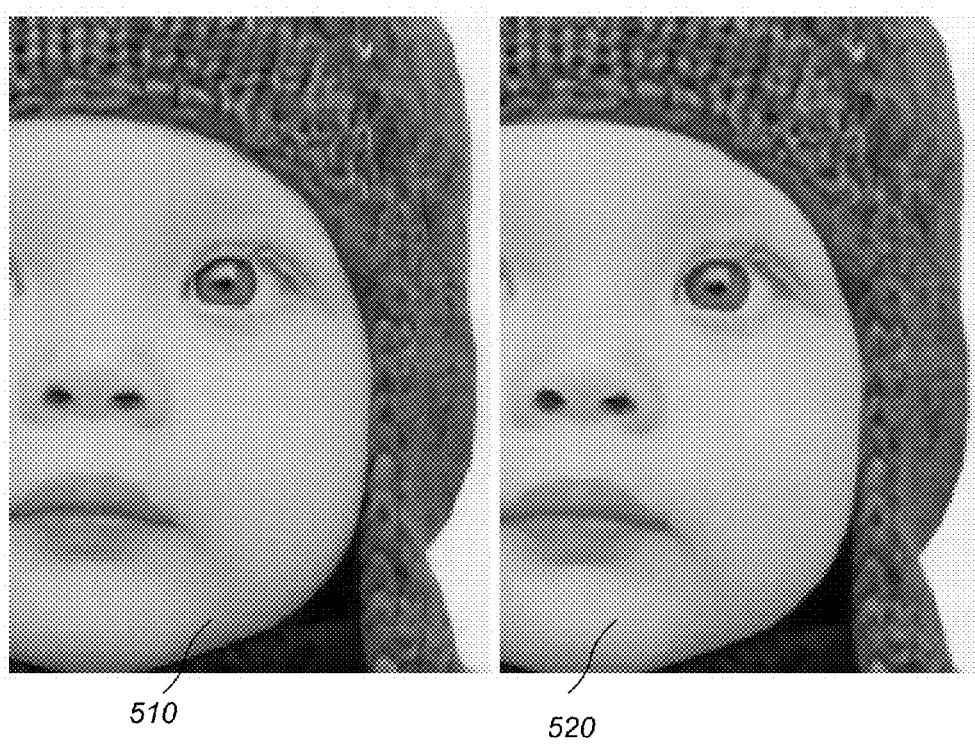
FIG. 5A depicts an example of an image upscaled using a genuine fractal upscaling method and an example of an image upscaled using the Glasner upscaling method.
Figure 5B:
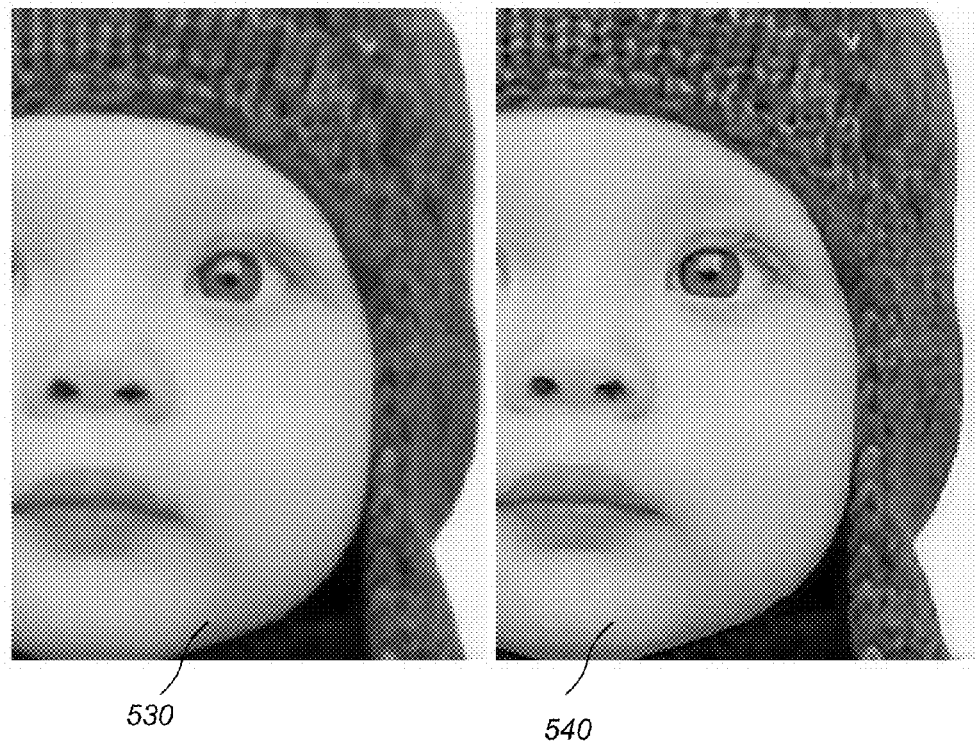
FIG. 5B illustrates an example of an image upscaled using the Freedman upscaling method and an example of an image upscaled using an embodiment.

FIG. 5A depicts an example of an image upscaled using a genuine fractal upscaling method 510 and an example of an image upscaled using the Glasner upscaling method 520. FIG. 5B illustrates an example of an image upscaled using the Freedman upscaling method 530 and an example of an image upscaled using an embodiment 540.

FIGS. 5A-5B show a comparison of results of the embodiments described herein 540 with Genuine Fractal 510, Glasner 520, and Freedman 530 methods on the "Kid" image. Both embodiments described herein 540 and the Glasner 520 and Freedman 530 methods perform much better than Genuine Fractal 510. Glasner's result 520 is overly sharp with significant visual artifacts. Freedman's result 530 is a little blurred and creates vertical, horizontal, and triangle type artifacts on the texture regions. Embodiments described herein recover more details (eye pupilla) and are relatively free of noticeable visual artifacts.

Figure 5C:
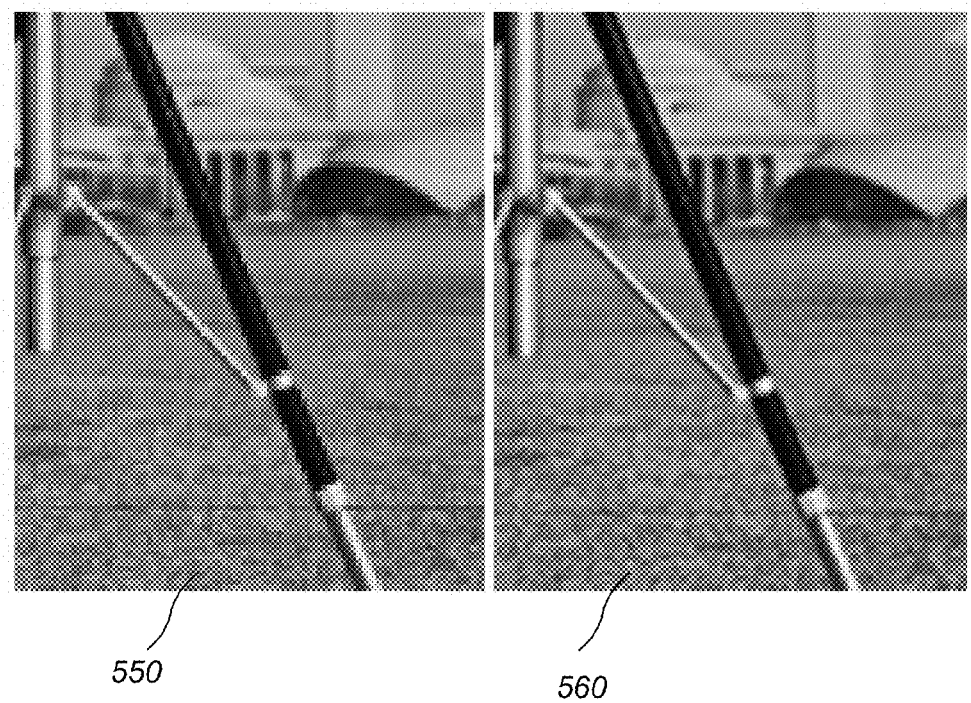
FIG. 5C depicts an example of an image upscaled using a nearest neighbor interpolation upscaling method and an example of an image upscaled using a bicubic interpolation upscaling method.

FIG. 5C depicts an example of an image upscaled using a nearest neighbor interpolation upscaling method 550 and an example of an image upscaled using a bicubic interpolation upscaling method 560.

Figure 5D:
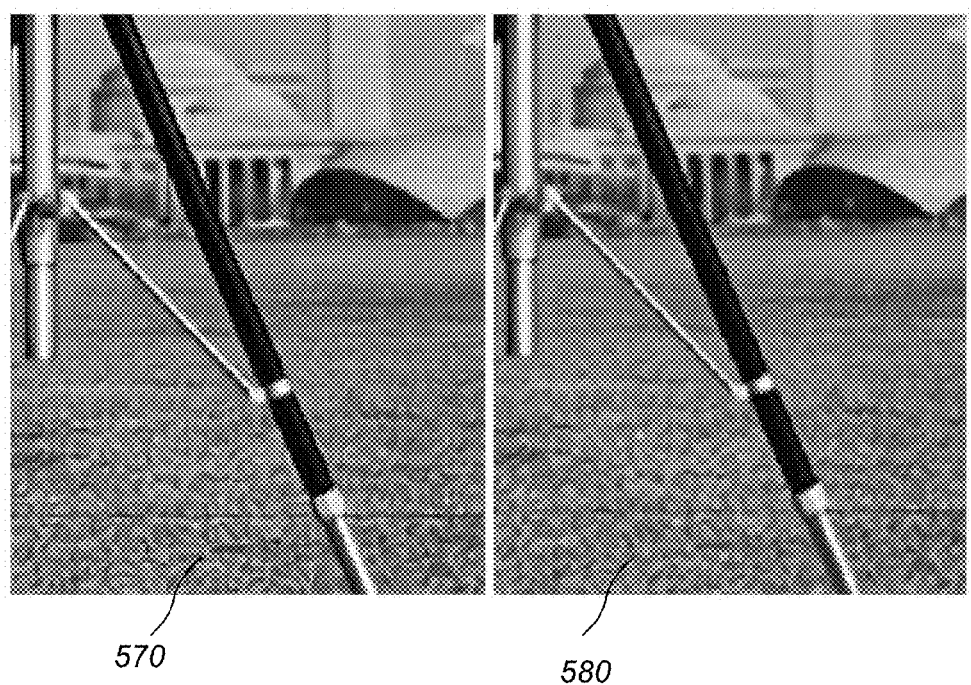
FIG. 5D illustrates an example of an image upscaled using the Freedman upscaling method and an example of an image upscaled using an embodiment.

FIG. 5D illustrates an example of an image upscaled using the Freedman upscaling method 570 and an example of an image upscaled using an embodiment 580. FIGS. 5C-5D shows the super-resolution result on the "cameraman" image. Notice that Freedman's method 570 performs very badly in the grass region, creating many artificial triangle type false edges, while the result of embodiments 580 is much more visually pleasing.

Figure 6A:
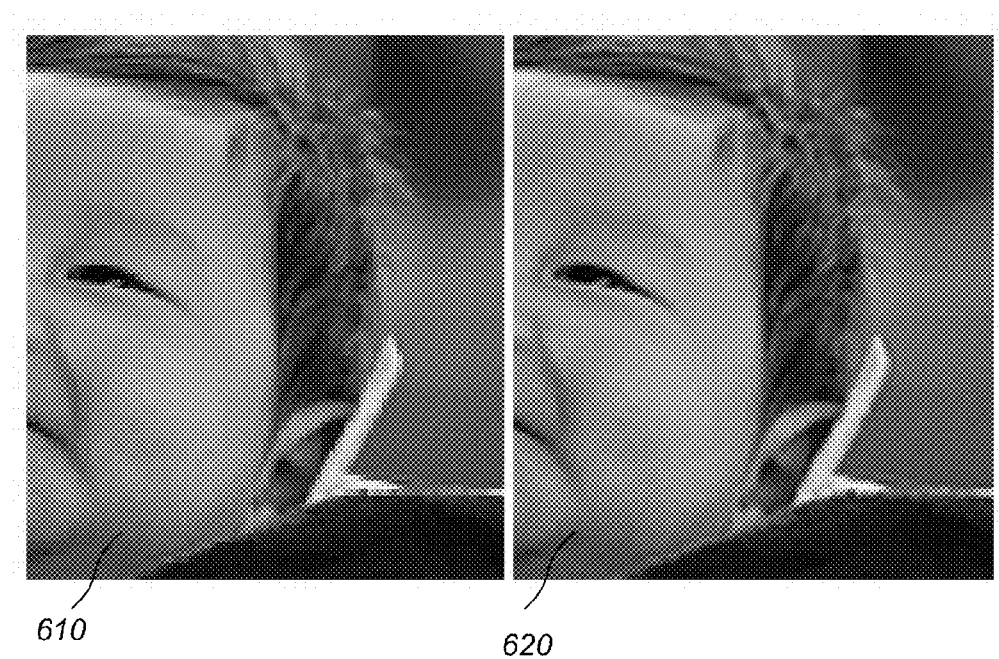
FIG. 6A depicts an example of an image upscaled using a nearest neighbor interpolation method and an example of an image upscaled using the bicubic interpolation upscaling method.
Figure 6B:
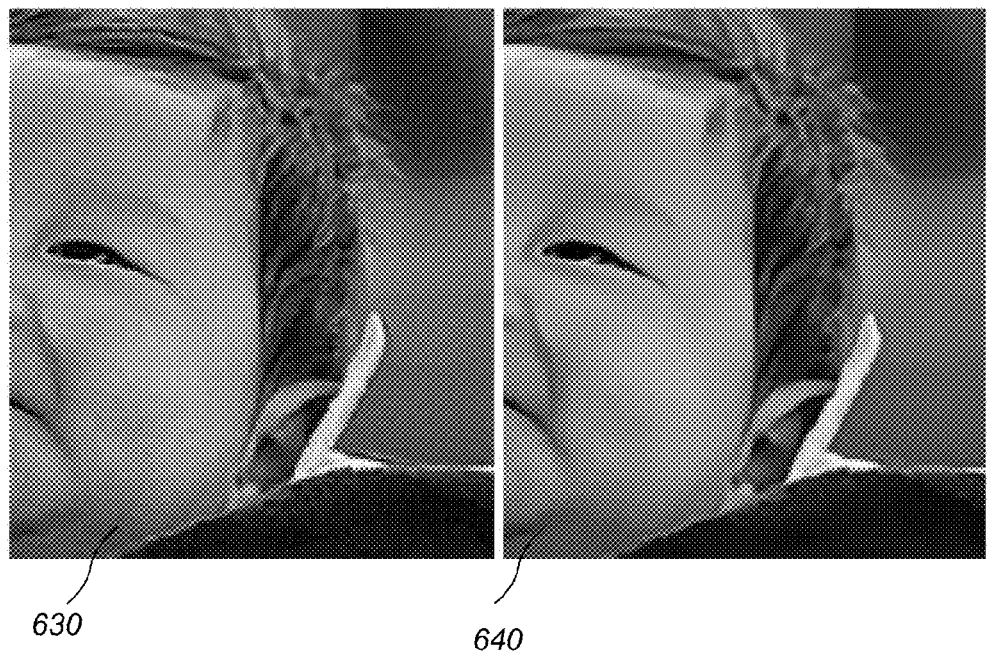
FIG. 6B illustrates an example of an image upscaled using the Freedman upscaling method and an example of an image upscaled using an embodiment.

FIG. 6A depicts an example of an image upscaled using a nearest neighbor interpolation method 610 and an example of an image upscaled using the bicubic interpolation upscaling method 620. FIG. 6B illustrates an example of an image upscaled using the Freedman upscaling method 630 and an example of an image upscaled using an embodiment 640. FIGS. 6A-6B demonstrate the robustness of embodiments to noise and JPEG compression artifacts that are common in practice. The "baby" image used for upscaling in FIGS. 6A-6B was captured by a mobile phone in suboptimal conditions, and thus was contaminated by some amount of noise. Results of Freedman's method 630 enhanced the noise, while results of embodiments of the methods described herein 640 almost totally eliminate the noise and at the same time keep the image sharp.

Figure 8A:
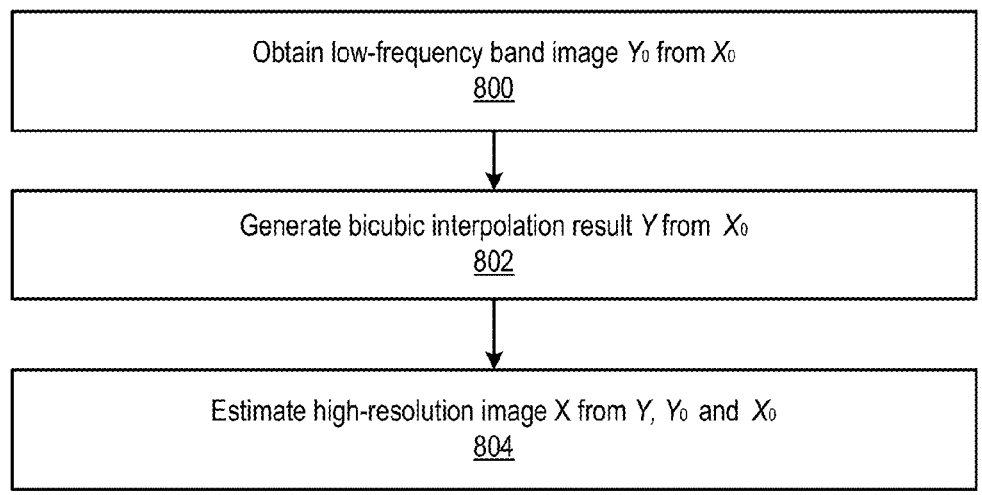
FIG. 8A is a flowchart of a method for robust patch regression based on in-place self-similarity for image upscaling, according to some embodiments.

Methods for Robust Patch Regression Based on in-place Self-similarity for Image Upscaling FIG. 8A is a flowchart of a method for robust patch regression based on in-place self-similarity for image upscaling, according to some embodiments. A low-frequency band image $Y_0$ is obtained from $X_0$ (block 800). A bicubic interpolation (upscaled) result Y is generated from $X_0$ (block 802). A high-resolution image is estimated X from Y, $Y_0$ and $X_0$ (block 804).

Figure 8B:
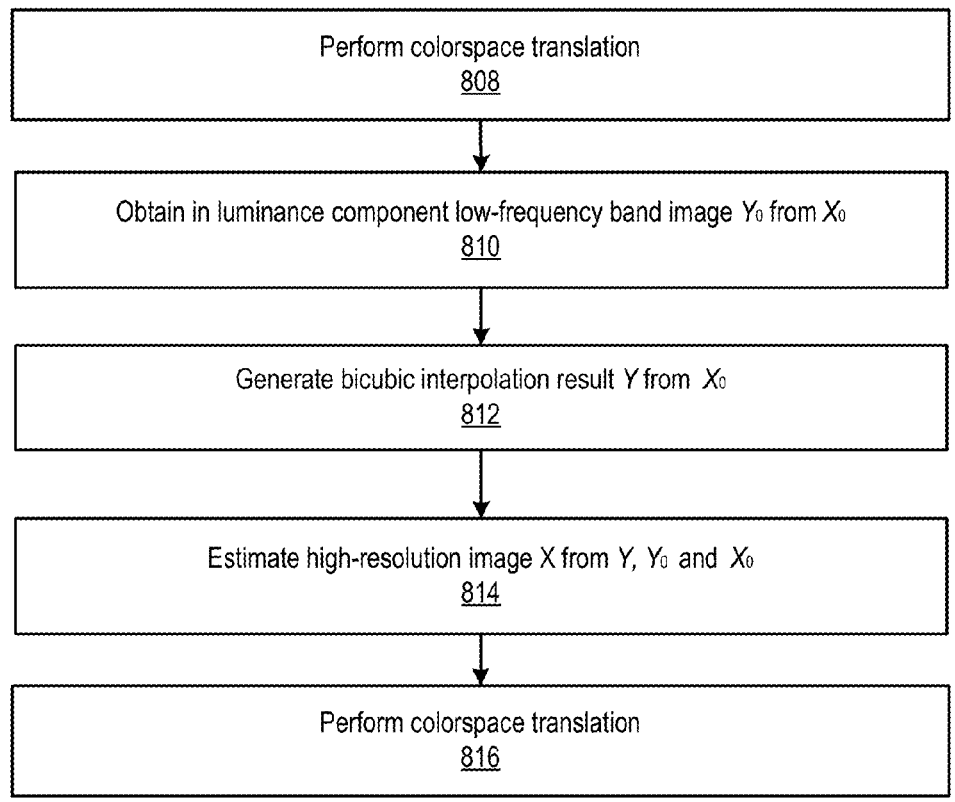
FIG. 8B is a flowchart of a method for robust patch regression based on in-place self-similarity for image upscaling with colorspace translation, according to some embodiments.

FIG. 8B is a flowchart of a method for robust patch regression based on in-place self-similarity for image upscaling with colorspace translation, according to some embodiments. Colorspace translation from a native colorspace, such as RGB, to a luminance-based colorspace is performed (block 808). A low-frequency band image $Y_0$ is obtained in the luminance component from $X_0$ (block 810). A bicubic interpolation result Y is generated from $X_0$ (block 812). A high-resolution image is estimated X from Y, $Y_0$ and $X_0$ (block 814). Colorspace translation from the luminance colorspace back to the native colorspace is performed (block 816). In some embodiments, blocks 810-814 are performed with respect to the luminance component, or otherwise on a single channel, and a traditional method of bicubic interpolation or other upscaling is performed with respect to remaining channels, such as chroma channels. The resulting data from all available channels may then be combined for translation back to the native colorspace in such embodiments. In other embodiments, other colorspaces may be used, including a single-channel colorspace such as grayscale.

Figure 9:
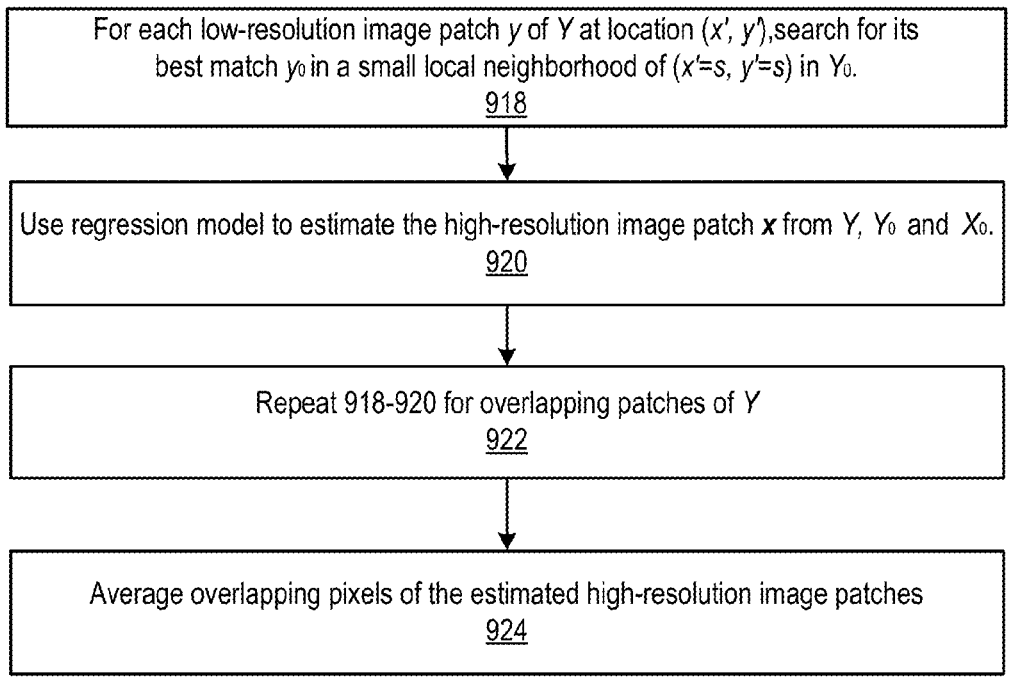
FIG. 9 is a flowchart of a method for estimation in robust patch regression based on in-place self-similarity for image upscaling, according to some embodiments.

FIG. 9 is a flowchart of a method for estimation in robust patch regression based on in-place self-similarity for image upscaling, according to some embodiments. In some embodiments, the operations portrayed with respect to FIG. 9 are an embodiment of block 804 of FIG. 8A. For each low-resolution image patch y of Y at location (x', y'), a search for its best match $y_0$ in a small local neighborhood of (x'=s; y'=s) in $Y_0$ is performed (block 918). A regression model is used to estimate the high-resolution image patch x from Y, $Y_0$ and $X_0$ (block 920). Blocks 918-920 are repeated for overlapping patches of Y (block 922). Overlapping pixels of the estimated high-resolution image patches are averaged, which, in some embodiments, results in denoising (block 924).

Figure 10A:
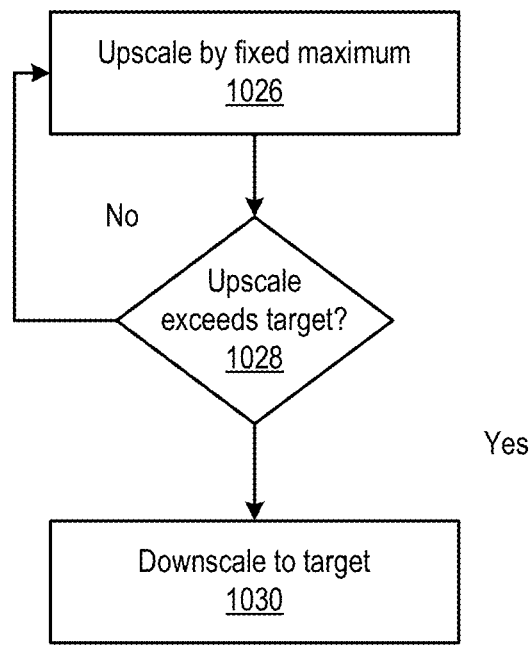
FIG. 10A is a flowchart of a method for iterative robust patch regression based on in-place self-similarity for image upscaling, according to an embodiment.
Figure 11:
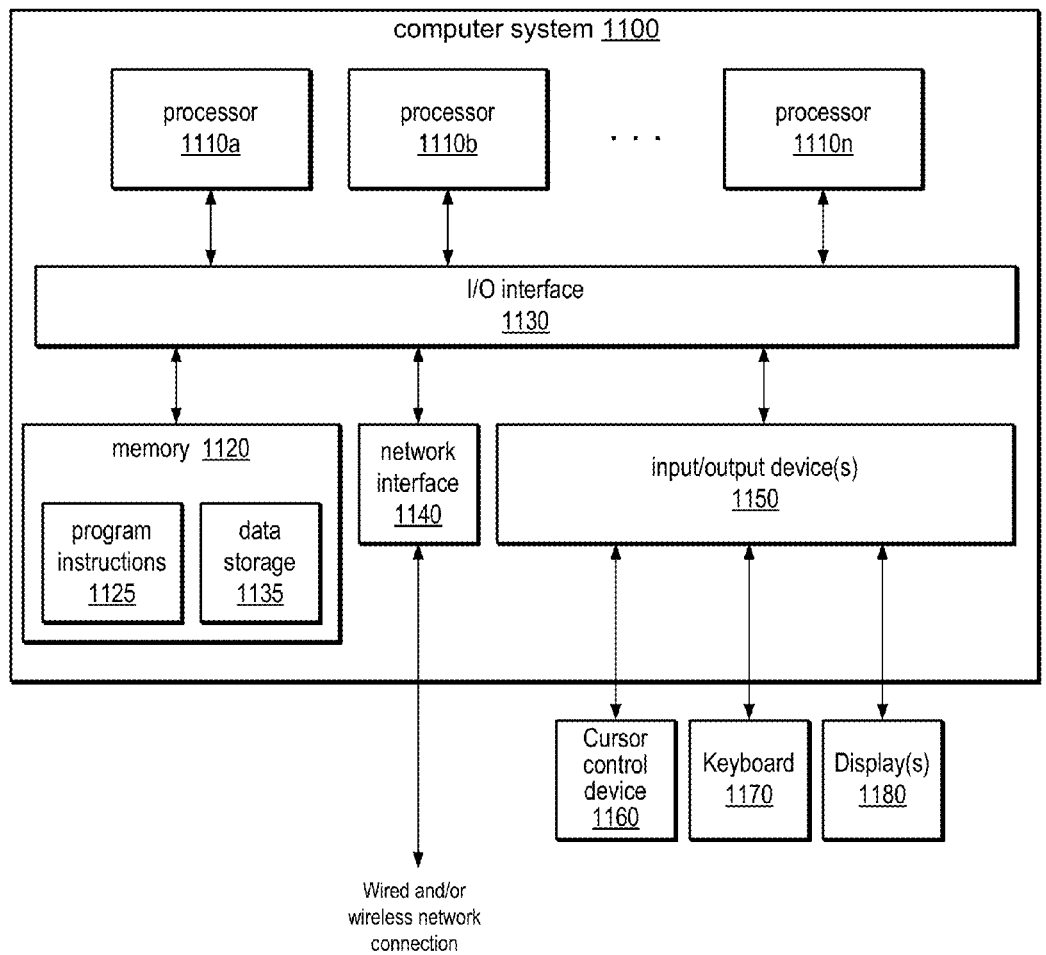
FIG. 11 illustrates an example computer system that may be used in embodiments.

FIG. 10A is a flowchart of a method for iterative robust patch regression based on in-place self-similarity for image upscaling, according to an embodiment. Upscaling by a fixed maximum is performed (block 1026), e.g., by executing the method of FIG. 8A by a fixed factor of 1.5. A determination is made as to whether the upscaling has exceeded a user-configurable target (block 1028). If the upscaling has not exceeded the user configurable target, the process returns to block 1026, which is described above. If the determination indicates that the upscaling has exceeded the user-configurable target, then a downscaling to the target is performed (block 1030).

Figure 10B:
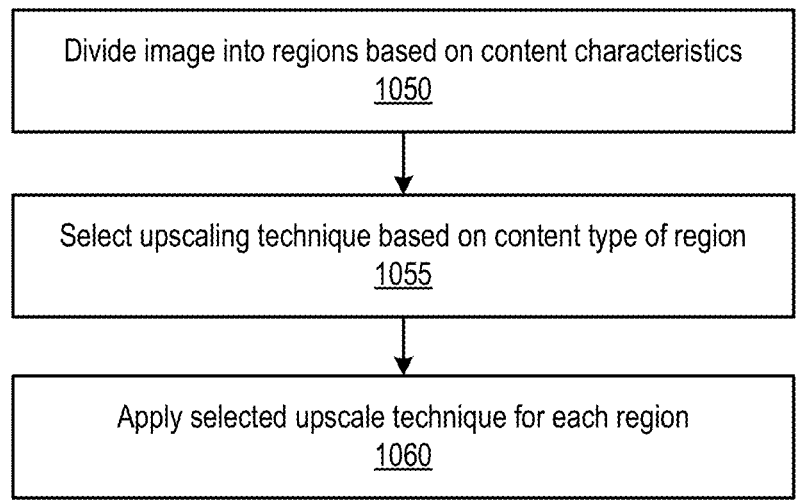
FIG. 10B is a flowchart of a method adaptive robust patch regression based on in-place self-similarity for image upscaling, according to an embodiment.

FIG. 10B is a flowchart of a method adaptive robust patch regression based on in-place self-similarity for image upscaling, according to an embodiment. An image is divided into regions based on content characteristics (block 1050). An upscaling technique is selected based on the content type of a region (block 1055). The selected upscaling technique is applied to the region (block 1060).

Figure 10C:
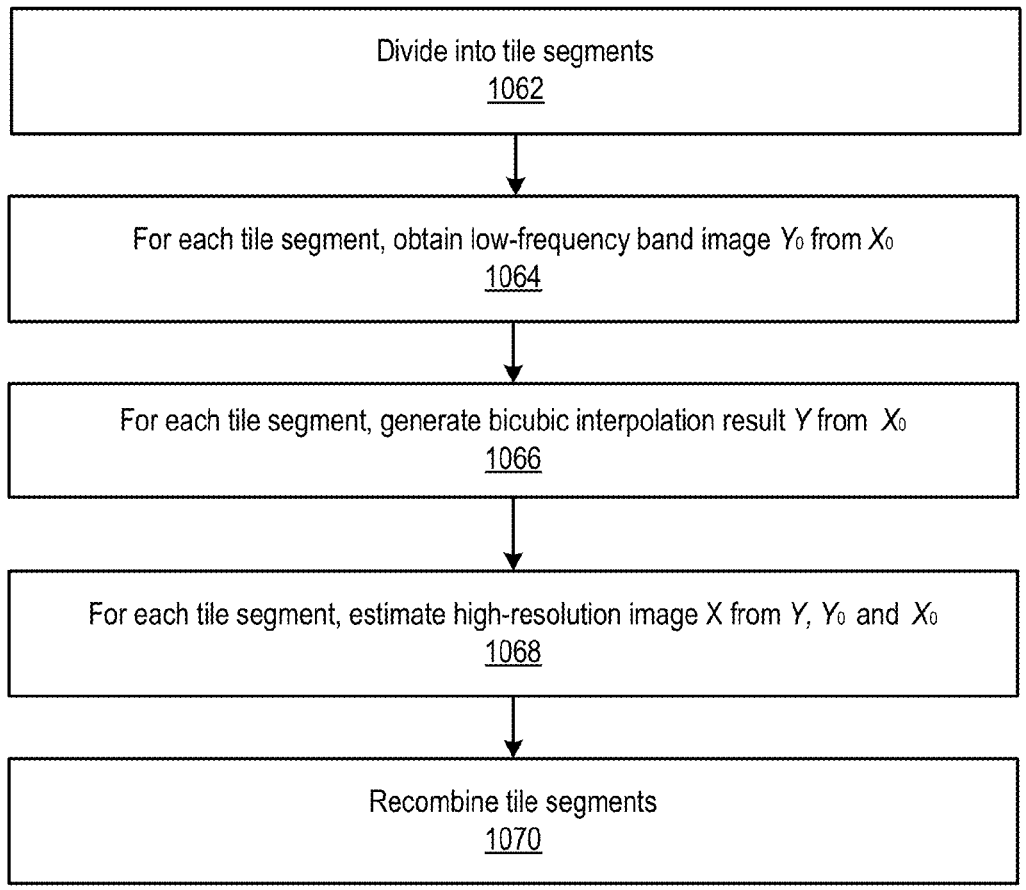
FIG. 10C is a flowchart of an alternative method for tile-decomposed robust patch regression based on in-place self-similarity for image upscaling, according to an embodiment.

FIG. 10C is a flowchart of an alternative method for tile-decomposed robust patch regression based on in-place self-similarity for image upscaling, according to an embodiment. An image is divided into tile segments (block 1062). For each tile segment, a low-frequency band image $Y_0$ is obtained from $X_0$ (block 1064). For each tile segment, a bicubic interpolation result Y is generated from $X_0$ (block 1066). For each tile segment, a high-resolution image is estimated X from Y, $Y_0$ and $X_0$ (block 1068). The tile segments are recombined (block 1070).

Figure 10D:
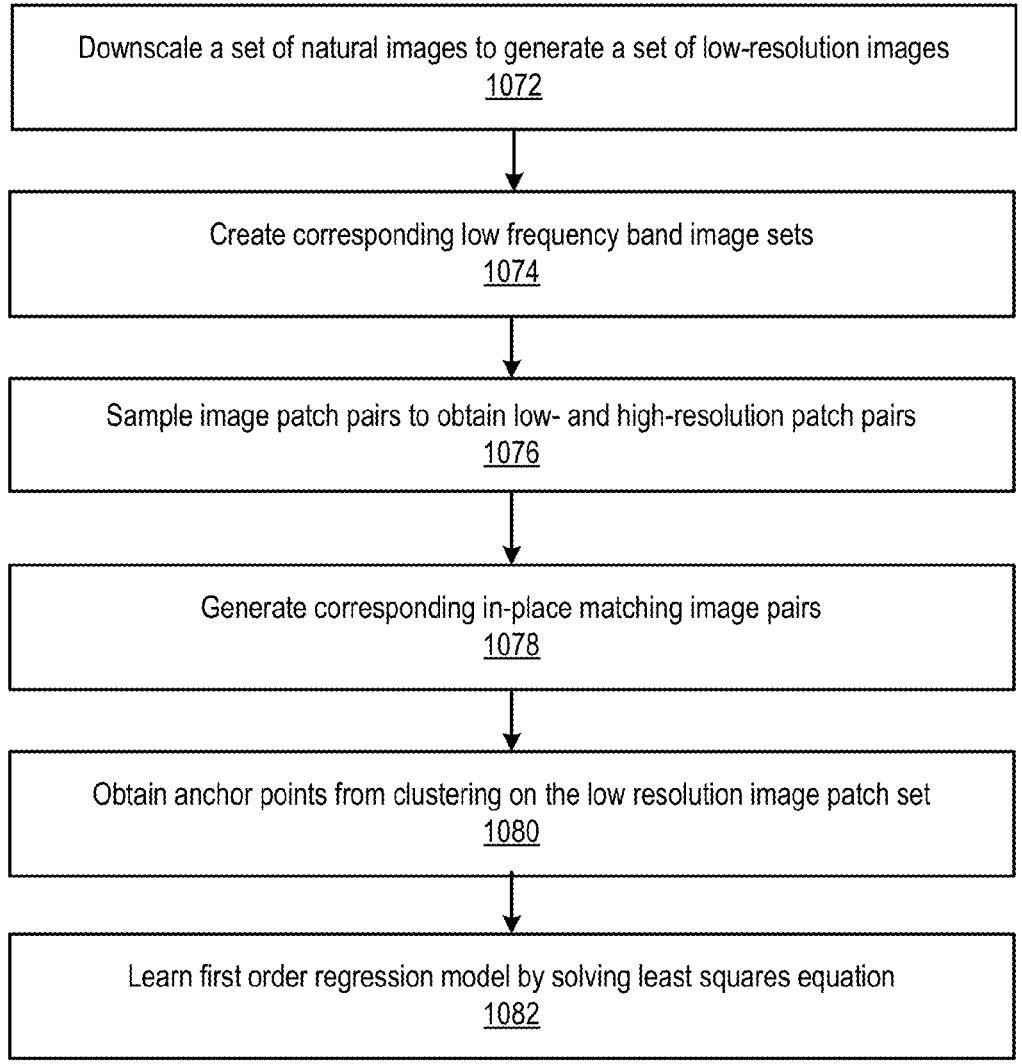
FIG. 10D is a flowchart of a method for a regression-based learning method, according to an embodiment.

FIG. 10D is a flowchart of a method for a regression-based learning method, according to an embodiment. A set of natural images is downscaled to generate a set of low-resolution images (block 1072). Corresponding low frequency band image sets are created (block 1074). Image patch pairs are sampled to obtain low- and high-resolution patch pairs (block 1076). Corresponding in-place matching image pairs are generated (block 1078). Anchor points are obtained from clustering on the low resolution image patch set (block 1080). A first order regression model is learned by solving least squares equation (block 1082).

Example System

Embodiments of a image upscaling module and/or of the various robust patch regression based on in-place self-similarity for image upscaling techniques as described herein may be executed on one or more computer systems, which may interact with various other devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some embodiments, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1120 may be configured to store program instructions and/or data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a image upscaling module are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. Generally speaking, a computer-accessible medium may include storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems, or between nodes of computer system 1100. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125, configured to implement embodiments of a image upscaling module as described herein, and data storage 1135, comprising various data accessible by program instructions 1125. In one embodiment, program instructions 1125 may include software elements of embodiments of an image upscaling module as illustrated in the above Figures. Data storage 1135 may include data that may be used in embodiments. In other embodiments, other or different software elements and data may be included.

Those skilled in the art will appreciate that computer system 1100 is merely illustrative and is not intended to limit the scope of a image upscaling module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
using one or more processors to perform operations comprising:
obtaining a low frequency band image intermediate from an input image;
obtaining an upsampled image intermediate; and
estimating a result image based at least in part on the upsampled image intermediate, the low frequency band image intermediate, and the input image, the input image is of a smaller scale than the result image, and the estimating the result image further comprises averaging the overlapping pixels to eliminate from the result image noise that is present in the input image.

2. The method of claim 1, wherein the eliminating from the result image noise further comprises eliminating compression artifacts.

3. The method of claim 1, wherein the estimating the result image further comprises:
for a low resolution image patch in the upsampled image intermediate, identifying a set of best matches;
estimating a high-resolution patch from the upsampled image intermediate, the low frequency band image intermediate, and the input image; and
repeating the identifying a best match and estimating a high resolution patch for a set of spatially overlapping, densely sampled low resolution patches to generate a set of overlapping pixels.

4. The method of claim 3, wherein the estimating a high resolution patch comprises:
denoising the center pixel of the low resolution patch by averaging it with center pixels of the best matching patches; and
performing regression for each of them to generate a set of regression results, and obtaining a final result using a weighted linear combination of the set of regression results.

5. The method of claim 1, wherein the method further comprises:
performing iterative repetitions of the obtaining the low frequency band image intermediate, the obtaining an upsampled image intermediate and the estimating the upscaling result image; and
in response to an iterative repetition exceeding a user-designated upscaling parameter, generating a final result image by downscaling a result of the iterative repetition exceeding the user-designated upscaling parameter.

6. The method of claim 5, wherein each of iterative repetitions further comprises upscaling the image by a factor of 1.5.

7. The method of claim 1, wherein the obtaining the low frequency band image intermediate from the input image further comprises translating the input image from a native colorspace to an intermediate colorspace, and the estimating the result image further comprises generating a result image in the native colorspace.

8. A system, comprising:
at least one processor; and
a memory comprising program instructions that are executable by the at least one processor to:
obtain a low frequency band image intermediate from an input image;
obtain an upsampled image intermediate; and
estimate a result image based at least in part on the upsampled image intermediate, the low frequency band image intermediate, and the input image, the input image is of a smaller scale than the result image, and the program instructions executable by the at least one processor to estimate the result image further comprise program instructions are executable by the at least one processor to eliminate from the result image noise that is present in the input image.

9. The system of claim 8, wherein the program instructions executable by the at least one processor to eliminate from the result image noise further comprise program instructions executable by the at least one processor to eliminate compression artifacts.

10. The system of claim 8, wherein the program instructions executable by the at least one processor to estimate the result image further comprise:
program instructions executable by the at least one processor to, for each low resolution image patch in the upsampled image intermediate, identify a set of best matches;
program instructions executable by the at least one processor to estimate a high-resolution patch from the upsampled image intermediate, the low frequency band image intermediate, and the input image; and
program instructions executable by the at least one processor to repeat the identifying a best match and estimating a high resolution patch for a set of spatially overlapping, densely sampled low resolution patches to generate a set of overlapping pixels.

11. The system of claim 10, wherein the program instructions executable by the at least one processor to identify a set of best matches comprise program instructions executable by the at least one processor to find k nearest neighbor patches.

12. The system of claim 8, further comprising:
program instructions executable by the at least one processor to perform iterative repetitions of the obtaining the low frequency band image intermediate, the obtaining an upsampled image intermediate and the estimating the upscaling result image; and
program instructions executable by the at least one processor to, in response to an iterative repetition exceeding a user-designated threshold, generate a final result image by downscaling a result of the iterative repetition exceeding the user-designated threshold.

13. The system of claim 12, wherein each of iterative repetitions further comprises upscaling the image by a factor of 1.5.

14. The system of claim 8, wherein the program instructions executable by the at least one processor to obtain the low frequency band image intermediate from the input image further comprise program instructions executable by the at least one processor to translate the input image from a native colorspace to an intermediate colorspace, and the program instructions executable by the at least one processor to estimate the result image further comprise program instructions executable by the at least one processor to generate a result image in the native colorspace.

15. A non-transitory computer-readable storage medium comprising program instructions stored thereon, the program instructions are computer-executable to perform operations comprising:
obtaining a low frequency band image intermediate from an input image;
obtaining an upsampled image intermediate; and
estimating a result image based at least in part on the upsampled image intermediate and the low frequency band image intermediate, wherein the input image is of a smaller scale than the result image, and the estimating the result image further comprises eliminating from the result image noise that is present in the input image.

16. The non-transitory computer-readable storage medium of claim 15, wherein the program instructions computer-executable to implement eliminating from the result image noise further comprise program instructions computer-executable to implement eliminating compression artifacts.

17. The non-transitory computer-readable storage medium of claim 15, wherein the estimating the result image further comprise:

program instructions computer-executable to implement for each low resolution image patch in the upsampled image intermediate, identifying a set of best matches;

program instructions computer-executable to implement estimating a high-resolution patch from the upsampled image intermediate, the low frequency band image intermediate, and the input image; and program instructions computer-executable to implement repeating the identifying a set of best matches and estimating a high resolution patch for a set of spatially overlapping, densely sampled low resolution patches to generate a set of overlapping pixels.

18. The non-transitory computer-readable storage medium of claim 17, wherein the program instructions computer-executable to implement estimating a high resolution patch comprise program instructions computer-executable to implement denoising the center pixel of the low resolution patch by averaging it with center pixels of the best matching patches, and performing regression for each of them to generate a set of regression results, and obtaining a final result using a weighted linear combination of the set of regression results.

19. The non-transitory computer-readable storage medium of claim 15, further comprising:

program instructions computer-executable to implement performing iterative repetitions of the obtaining the low frequency band image intermediate, the obtaining an upsampled Image intermediate and the estimating the upscaling result image; and program instructions computer-executable to implement, in response to an iterative repetition exceeding a user-designated upscaling parameter, generating a final result image by downscaling a result of the iterative repetition exceeding the user-designated upscaling parameter.

20. The non-transitory computer-readable storage medium of claim 19, wherein each of iterative repetitions further comprises up scaling the image by a factor of 1.5.

* * * * *